(12) United States Patent
Furuta

(10) Patent No.: US 10,864,598 B2
(45) Date of Patent: Dec. 15, 2020

(54) EVALUATION JIG AND EVALUATION METHOD FOR HEIGHT POSITION DETECTION UNIT OF LASER PROCESSING APPARATUS

(71) Applicant: DISCO CORPORATION, Tokyo (JP)

(72) Inventor: Kenji Furuta, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 248 days.

(21) Appl. No.: 15/962,481

(22) Filed: Apr. 25, 2018

(65) Prior Publication Data

US 2018/0304402 A1 Oct. 25, 2018

(30) Foreign Application Priority Data

Apr. 25, 2017 (JP) .................. 2017-086311

(51) Int. Cl.
| | | |
|---|---|---|
| *B23K 26/03* | (2006.01) | |
| *B23K 26/53* | (2014.01) | |
| *G01B 11/06* | (2006.01) | |
| *B23K 26/046* | (2014.01) | |
| *B23K 26/08* | (2014.01) | |
| *G01B 7/02* | (2006.01) | |
| *B23K 103/00* | (2006.01) | |

(52) U.S. Cl.
CPC ............ *B23K 26/03* (2013.01); *B23K 26/046* (2013.01); *B23K 26/083* (2013.01); *B23K 26/53* (2015.10); *G01B 7/02* (2013.01); *G01B 11/0608* (2013.01); *B23K 2103/56* (2018.08)

(58) Field of Classification Search
CPC ...... B23K 26/03; B23K 26/53; B23K 26/046; B23K 26/083; B23K 2103/56
See application file for complete search history.

(56) References Cited

U.S. PATENT DOCUMENTS

2009/0277889 A1* 11/2009 Kobayashi ........... B23K 26/046
219/121.67
2009/0291544 A1* 11/2009 Watanabe ............ B23K 26/046
438/463

FOREIGN PATENT DOCUMENTS

JP 2010142819 A 7/2010

* cited by examiner

*Primary Examiner* — Brian W Jennison
(74) *Attorney, Agent, or Firm* — Greer Burns & Crain, Ltd.

(57) ABSTRACT

Disclosed herein is an evaluation jig that is a jig to be used for evaluation of a height position detection unit that detects the height position of a holding surface of a chuck table of a laser processing apparatus. The evaluation jig includes a to-be-irradiated surface which is to be irradiated with a detection laser beam, an actuator that moves the to-be-irradiated surface in a Z-axis direction, a base section that supports the actuator and is mounted on the holding surface of the chuck table, and a control unit that controls movement of the actuator.

6 Claims, 13 Drawing Sheets

EVALUATION JIG AND EVALUATION METHOD FOR HEIGHT POSITION DETECTION UNIT OF LASER PROCESSING APPARATUS

BACKGROUND OF THE INVENTION

Field of the Invention

The present invention relates to an evaluation jig and an evaluation method for a height position detection unit of a laser processing apparatus.

Description of the Related Art

There has been known a laser processing apparatus to be used in processing a wafer, formed with semiconductor devices or light emitting diode (LED) devices, or various plate-shaped workplaces along division lines (streets). The laser processing apparatus is used at the time of carrying out a processing method in which a laser beam having such a wavelength as to be transmitted through a workplace is applied to the workpiece along the division lines, to form modified layers in the inside of the workpiece, and the workpiece is divided into a plurality of device chips, with the modified layers as fracture starting points. This kind of laser processing apparatus has been being used more and more widely because it is advantageous in that unlike in the case of cutting by a cutting blade, cutting water is not used at the time of forming the modified layers, and the cutting allowance is very narrow.

If the modified layer is not formed at a predetermined position in the thickness direction of the workpiece, the workpiece may be fractured at a position deviated from the modified layer, or the workplace may not be fractured. In view of this, a laser processing apparatus has been developed which includes a height position detection unit for measuring, before processing, the height of the workpiece along the division line, and a focal point position adjusting unit capable of adjusting the focal point of a laser beam according to the result of measurement by the height position detection unit (see, for example, Japanese Patent Laid-Open No. 2010-142819). By this laser processing apparatus, the modified layer can be formed at a predetermined depth from the surface of the workpiece, even when the thickness of the workpiece is varied in plane.

SUMMARY OF THE INVENTION

In the laser processing apparatus disclosed in Japanese Patent Laid-Open No. 2010-142819, it is necessary to evaluate, before processing the workpiece, whether the height position detection unit is capable of accurate height detection. Therefore, in the case of the laser processing apparatus of Japanese Patent Laid-open No. 2010-142819, an evaluation plate-shaped body whose height position information (information indicative of the relation between position in a horizontal direction and height) has been grasped is fixed on a chuck table, and, while performing processing feeding of the chuck table, a detection laser beam is applied to the evaluation plate-shaped body, to conduct height measurement. The height information obtained by the measurement and the preliminarily grasped height position information are compared with each other, and, if there is no difference between them, it can be determined that the detection accuracy of the height position detection unit is suitable for processing. This method, however, has a problem that the evaluation of the height position detection unit cannot be accomplished unless there is the evaluation plate-shaped body whose height position is preliminarily grasped.

Accordingly, it is an object of the present invention to provide an evaluation jig and an evaluation method for a height position detection unit of a laser processing apparatus by which the height position detection unit can be evaluated without using an evaluation plate-shaped body whose height position is preliminarily known.

In accordance with an aspect of the present invention, there is provided an evaluation jig for a height position detection unit of a laser processing apparatus, the laser processing apparatus including a chuck table that holds a workpiece by a holding surface, a laser beam applying unit having a laser oscillator that applies a processing laser beam having such a wavelength as to be transmitted through the workpiece to the workpiece held by the chuck table, and a focusing unit that focuses the processing laser beam, a focal point position adjusting unit that displaces a focal point position of the processing laser beam, the height position detection unit that applies a detection laser beam to the workpiece held by the chuck table through the focusing unit to detect a height position of an upper surface of the workpiece, and a control unit that controls the focal point position adjusting unit based on a detection signal from the height position detection unit. The evaluation jig includes a to-be-irradiated surface which is to be irradiated with the detection laser beam, an actuator that moves the to-be-irradiated surface in a direction orthogonal to the to-be-irradiated surface, a base section which supports the actuator and is mounted on the holding surface, and a control section that controls movement of the actuator.

Preferably, the actuator includes a piezo actuator or a voice coil motor.

In accordance with another aspect of the present invention, there is provided an evaluation method for a height position detection unit of a laser processing apparatus, the evaluation method including a mounting step of mounting an evaluation jig on a holding surface of a chuck table of the laser processing apparatus, the evaluation jig including a to-be-irradiated surface which is to be irradiated with a detection laser beam, an actuator that moves the to-be-irradiated surface in a direction orthogonal to the to-be-irradiated surface, a base section which supports the actuator and is mounted on the holding surface of the chuck table, and a control section that controls movement of the actuator. The evaluation method further includes a program setting step of setting a movement program for controlling the actuator of the evaluation jig to move the to-be-irradiated surface at a desired amplitude, a height detection step of irradiating the to-be-irradiated surface of the evaluation jig mounted on the holding surface with the detection laser beam of the laser processing apparatus and detecting variation in a height position of the to-be-irradiated surface moved at the desired amplitude according to the movement program by the height position detection unit of the laser processing apparatus, and a comparison and determination step of comparing the variation in the height position detected in the height detection step with the amplitude set in the program setting step and determining whether or not the height position detection unit has successfully detected the height position of the to-be-irradiated surface.

The present invention produces an effect that a height position detection unit can be evaluated without using an evaluation plate-shaped body whose height position is preliminarily known.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
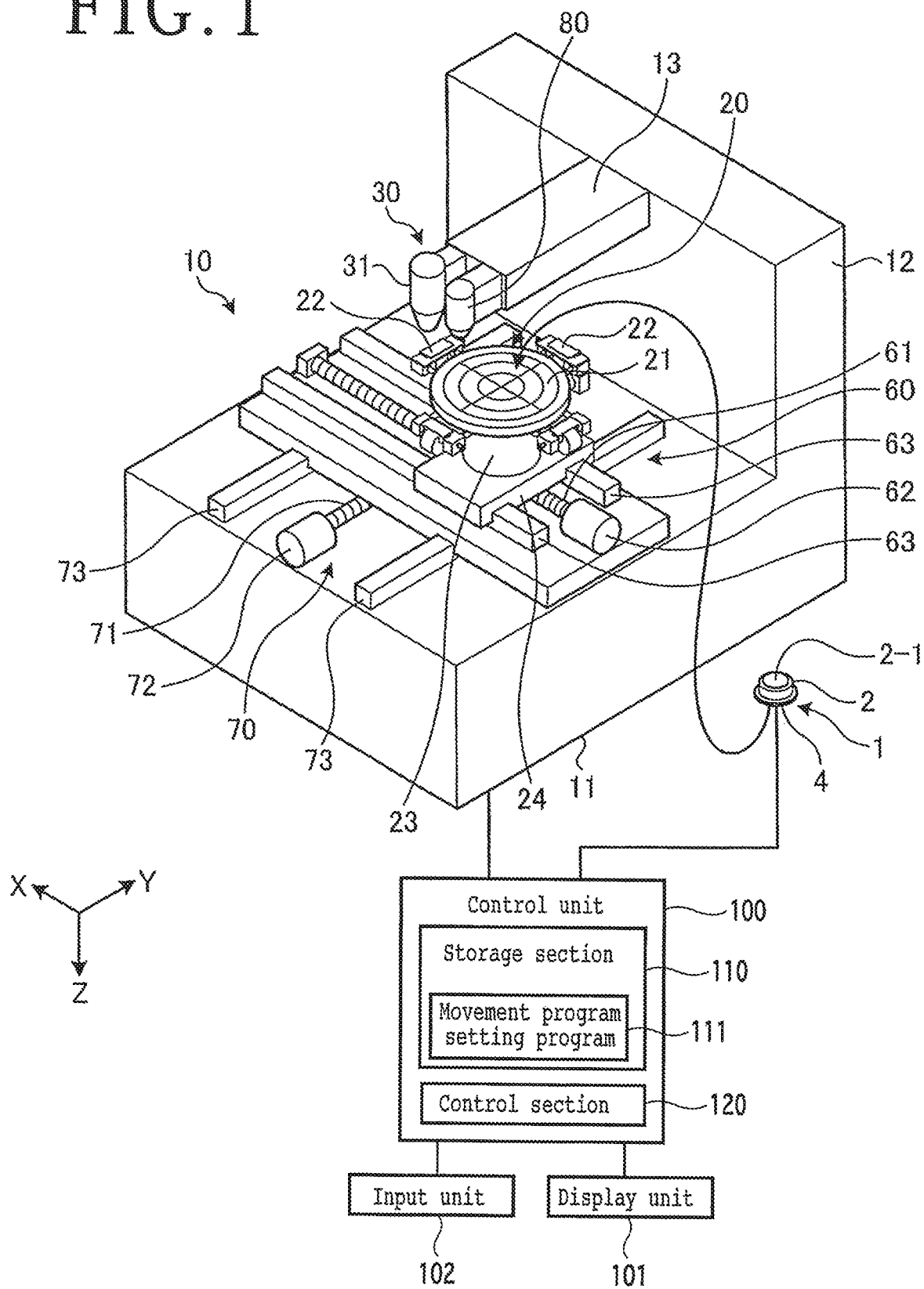
FIG. 1 is a perspective view depicting a general configuration example of a laser processing apparatus to be evaluated by an evaluation jig for a height position detection unit according to a first embodiment.

Modes (embodiments) for carrying out the present invention will be described in detail, referring to the drawings. The present invention is not to be limited by the contents of the following description of the embodiments. In addition, the constituent elements described below include ones which can be easily conceived by those skilled in the art and the substantial equivalences thereof. Further, the configurations described below can be combined, as required. Besides, various omissions, replacements, and modifications of the configurations can be made within the scope of the gist of the present invention.

Figure 2:
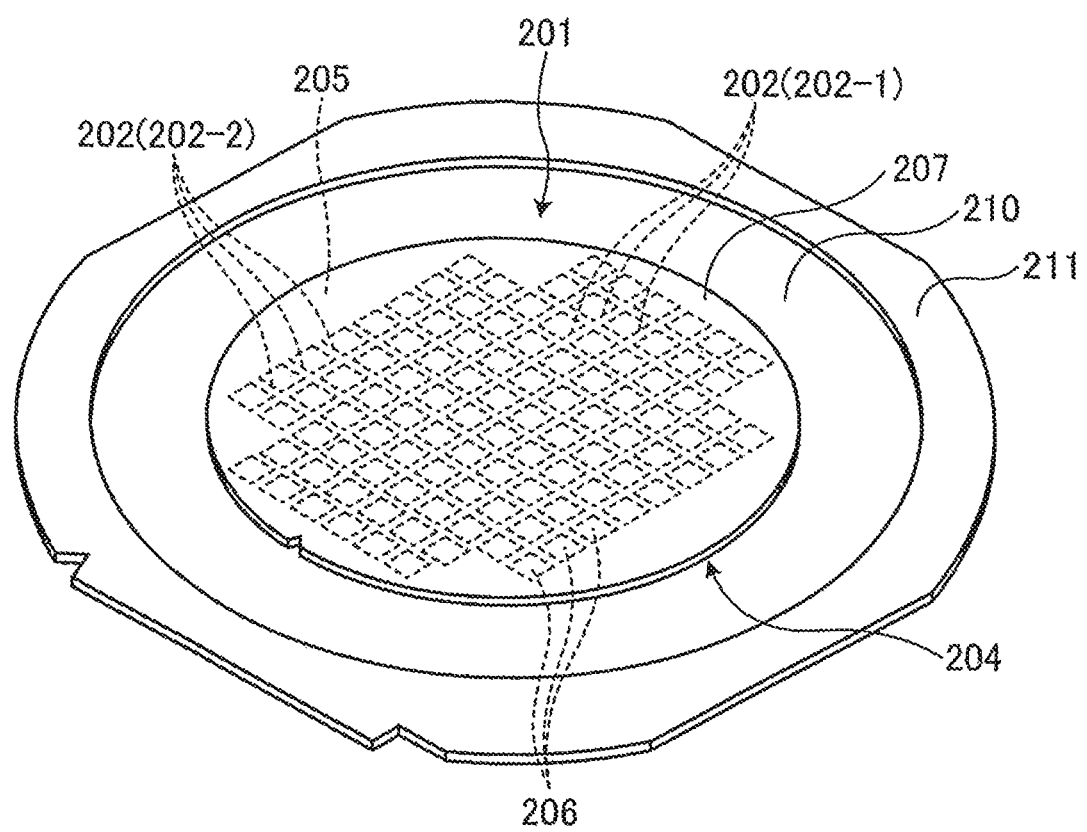
FIG. 2 is a perspective view of a wafer to be processed by the laser processing apparatus depicted in FIG. 1.
Figure 3:
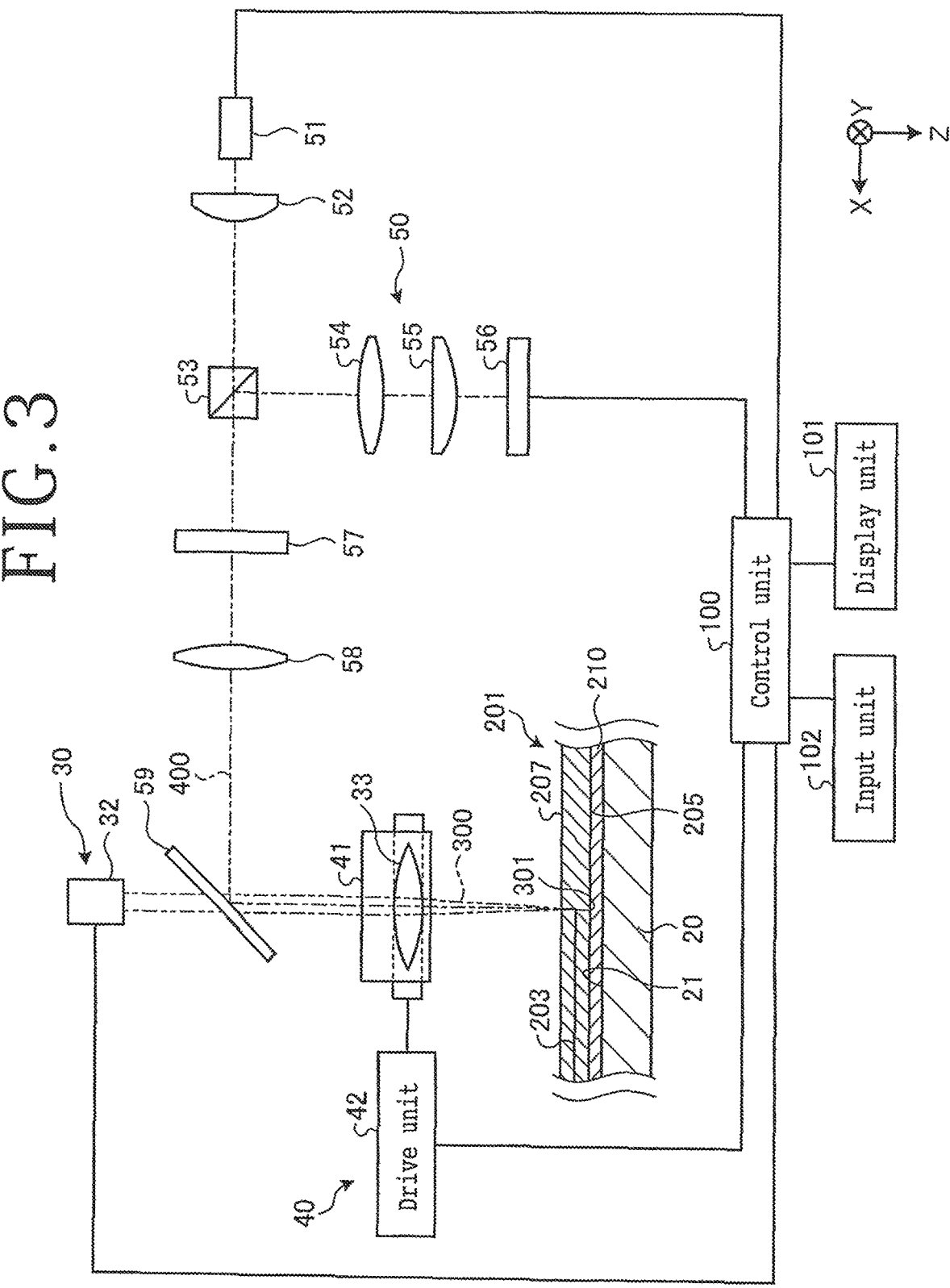
FIG. 3 is a diagram depicting the configuration of the height position detection unit and the like of the laser processing apparatus depicted in FIG. 1.

An evaluation jig 1 for a height position detection unit according to a first embodiment is a jig for evaluation of a height position detection unit 50 depicted in FIG. 3 of a laser processing apparatus 10 depicted in FIG. 1. The laser processing apparatus 10 depicted in FIG. 1 is an apparatus for forming a modified layer 203 depicted in FIG. 3, along each of division lines 202 of a wafer 201 depicted in FIG. 2 as a workpiece.

In the first embodiment, the wafer 201 as a workpiece to be processed by the laser processing apparatus 10 according to the first embodiment is a disk-shaped semiconductor wafer or optical device wafer having a substrate 204 formed of silicon, sapphire, gallium arsenide or the like. As depicted in FIG. 2, the wafer 201 has devices 206 formed individually in a plurality of regions partitioned by a plurality of division lines (streets) 202 which are intersecting (in the first embodiment, crossing) on a front surface 205.

The wafer 201 has a semiconductor device such as an integrated circuit (IC) or a large, scale integration (LSI), or a light emitting diode (LED) formed in each of the regions as the device 206. The division lines 202 include a plurality of first division lines 202-1 which are parallel to each other and a plurality of second division lines 202-2 which are parallel to each other and are orthogonal to the first division lines 202-1. In the first embodiment, an adhesive tape 210 is adhered to the front surface 205 of the wafer 201, and an outer edge of the adhesive tape 210 is attached to an annular frame 211, whereby the wafer 201 is supported at an opening of the annular frame 211 through the adhesive tape 210, with its back surface 207 exposed.

The laser processing apparatus 10 is for applying a processing laser beam 300 (depicted in FIG. 3), which has such a wavelength as to be transmitted through the wafer 201, along the division lines 202-1 and 202-2 from the back surface 207 side of the wafer 201, to form the modified layer 203 as a fracture starting points in the inside of the wafer 201 by the processing laser beam 300. Note that the modified layer 203 means a region brought into a state of being different from the surroundings in density, refractive index, mechanical strength, or other physical property, and examples thereof include a melting treatment region, a crack, region, a dielectric breakdown region, a refractive index change region, and a region in which these are mixedly present.

As illustrated in FIG. 1, the laser processing apparatus 10 includes a chuck table 20 that holds the wafer 201 by a holding surface 21, a laser beam applying unit 30, a focal point position adjusting unit 40 depicted in FIG. 3, and a height position detection unit 50 depicted in FIG. 3. In addition, the laser processing apparatus 10 includes an X-axis moving unit 60 for causing relative movement of the chuck table 20 and the laser beam applying unit 30 in an X-axis direction, a Y-axis moving unit 70 for causing relative movement of the chuck table 20 and the laser beam applying unit 30 in a Y-axis direction, an imaging unit 80, and a control unit 100.

The chuck, table 20 has the holding surface 21 for holding the wafer 201 thereon. The holding surface 21 holds the wafer 201 attached to the opening of the annular frame 211 through the adhesive tape 210. The holding surface 21 is formed in a disk-like shape from porous ceramic or the like, and is connected to an evacuation source (not depicted) through an evacuation passage (not depicted). The holding surface 21 holds by suction the wafer 201 mounted thereon, through the adhesive tape 210. In the first embodiment, the holding surface 21 is a plane surface parallel to both the X-axis direction and the Y-axis direction. In the periphery of the chuck table 20, there are provided a plurality of clamp sections 22 for clamping the annular frame 211 surrounding the wafer 201. In addition, the chuck table 20 causes rotation about a center axis parallel to the Z-axis direction by a rotating unit 23. The rotating unit 23 is placed on a moving table 24 which is moved in the X-axis direction by the X-axis moving unit 60.

The X-axis moving unit 60 is means for moving the chuck table 20 in the X-axis direction to thereby cause processing feeding of the chuck table 20 in the X-axis direction. The X-axis moving unit 60 includes a ball screw 61 provided to be rotatable about an axis, a pulse motor 62 for rotating the ball screw 61 about the axis, and guide rails 63 for supporting the chuck table 20 such that the chuck table 20 is movable in the X-axis direction.

The Y-axis moving unit 70 is means for moving the chuck table 20 in the Y-axis direction to thereby cause indexing feeding of the chuck table 20. The Y-axis moving unit 70 includes a ball screw 71 provided to be rotatable about an axis, a pulse motor 72 for rotating the ball screw 71 about the axis, and guide rails 73 for supporting the chuck table 20 such that the chuck table 20 is movable in the Y-axis direction.

The laser beam applying unit 30 is a unit for applying a processing laser beam 300, which has such a wavelength as to be transmitted through the wafer 201, to the wafer 201 held by the chuck table 20, from the back surface 207 side. The laser beam applying unit 300 is a unit for forming the modified layer 203 in the inside of the water 201 by the processing laser beam 300.

The laser beam applying unit 30 includes a processing head 31 depicted in FIG. 1, a laser oscillator 32 depicted in FIG. 3, and a focusing lens 33 as a focusing unit. The processing head 31 is mounted to a tip of a support column 13 continuous with a wall section 12 erected from an apparatus main body 11 of the laser processing apparatus 10.

The laser oscillator 32 oscillates the processing laser beam 300, and applies the thus oscillated processing laser beam 300 to the wafer 201, held by the chuck table 20, from the tip of the processing head 31 through a dichroic mirror 59. The dichroic mirror 59 is disposed on an optical path of the processing laser beam 300 between the laser oscillator 32 and the focusing lens 33. The dichroic mirror 59 transmits the processing laser beam 300 therethrough. The processing laser beam 300 oscillated by the laser oscillator 32 is, for example, a yttrium aluminum garnet (YAG) laser beam or a yttrium vanadate (YVO) laser beam. In the first embodiment, the wavelength of the processing laser beam 300 is, for example, 1,064 nm, which is not limitative. The focusing lens 33 is for focusing the processing laser beam 300 onto a point inside the wafer 201.

The focal point position adjusting unit 40 is for displacing the position of a focal point 301 of the processing laser beam 300 in the Z-axis direction. The focal point position adjusting unit 40 includes a lens holder 41 for holding the focusing lens 33, and a drive unit 42 for moving the lens holder 41 in the Z-axis direction. The drive unit 42 includes a ball screw, a pulse motor, or a piezo motor which is known.

The height position detection unit 50 is for applying a detection laser beam 400 depicted in FIG. 3 to the wafer 201, held by the chuck table 20, through the focusing lens 33, to detect the position in the Z-axis direction, or the height position, of the back surface 207 as an upper surface of the wafer 201 held by the chuck table 20. Note that in the present invention, the position in the Z-axis direction is expressed with that of the holding surface 21 as a reference (0 μm). The height position detection unit 50 includes a detection laser oscillator 51, a collimator lens 52, a polarization beam splitter 53, a convex lens 54, a cylindrical lens 55, a photodetector 56, a quarter wavelength plate 57, and a convex lens 58.

Figure 5:
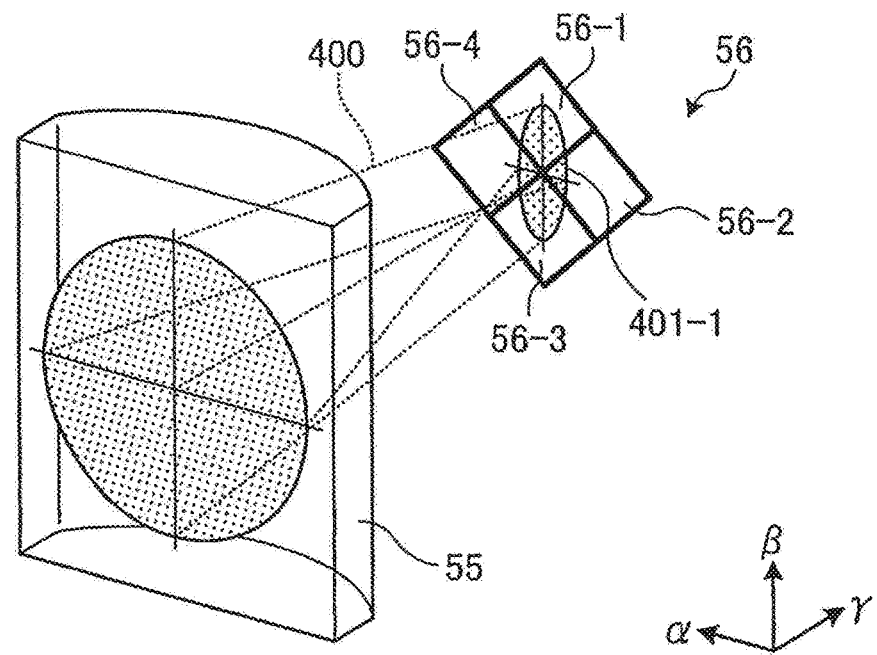
FIG. 5 is an illustration depicting a case where a beam of a detection laser beam in a photodetector of the height position detection unit depicted in FIG. 3 is a vertically elongated ellipse in shape.
Figure 6:
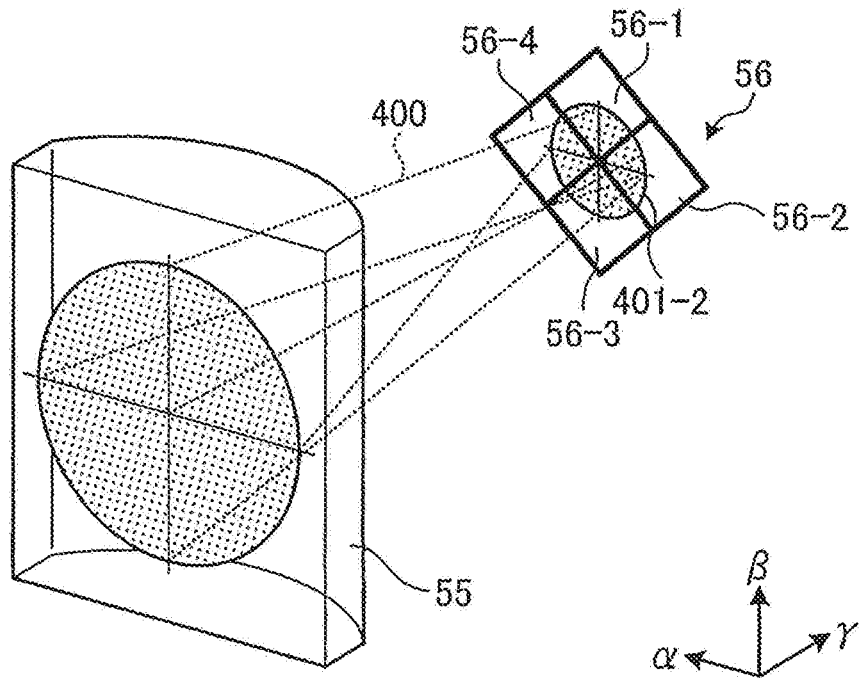
FIG. 6 is an illustration depicting a case wherein the beam of the detection laser beam in the photodetector of the height position detection unit depicted in FIG. 3 is a circle in shape.
Figure 7:
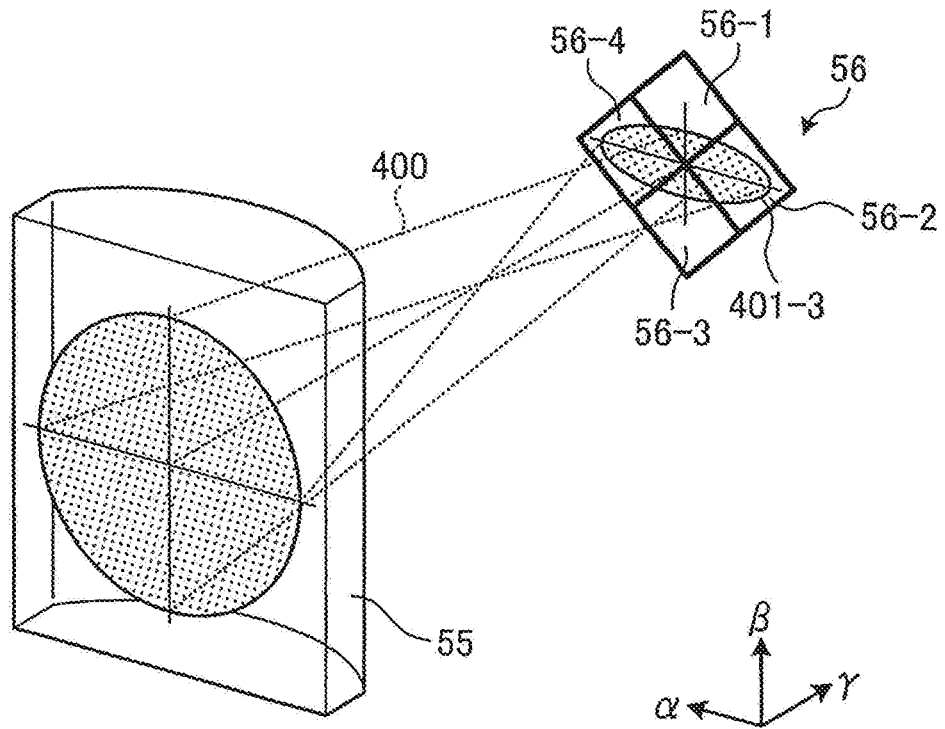
FIG. 7 is an illustration depicting a case wherein the beam of the detection laser beam in the photodetector of the height position detection unit depicted in FIG. 3 is a horizontally elongated ellipse in shape.

The detection laser oscillator 51 includes, for example, a laser diode, oscillates the detection laser beam 400 having a predetermined wavelength, and applies the detection laser beam 400 to the dichroic mirror 59 sequentially through the collimator lens 52, the polarization beam splitter 53, the quarter wavelength plate 57, and the convex lens 58. As depicted in FIGS. 5, 6, and 7, the photodetector 56 includes a photodiode having four divisional regions 56-1, 56-2, 56-3, and 56-4. The detection laser beam 400 applied from the detection laser oscillator 51 is converted by the collimator lens 52 into parallel light, which is transmitted through the polarization beam splitter 53 and the quarter wavelength plate 57, and is reflected by the dichroic mirror 59. The detection laser beam 400 reflected by the dichroic mirror 59 is applied through the focusing lens 33 to the back surface 207 of the wafer 201 held on the holding surface 21.

The detection laser beam 400 reflected by the back surface 207 of the wafer 201 is reflected by the dichroic mirror 59, and is transmitted through the convex lens 58, to be incident on the quarter wavelength plate 57. Here, the detection laser beam 400 reflected by the back surface 207 of the wafer 201 is transmitted through the quarter wavelength plate 57 twice, namely, in its forward route toward the wafer 201 and in its backward route after reflection on the wafer 201, and, therefore, its polarization direction is rotated by 90°. For this reason, the detection laser beam 400 reflected by the back surface 207 of the wafer 201 is reflected by the polarization beam splitter 53, and is focused by the convex lens 54, to be incident on the cylindrical lens 55.

Figure 4:
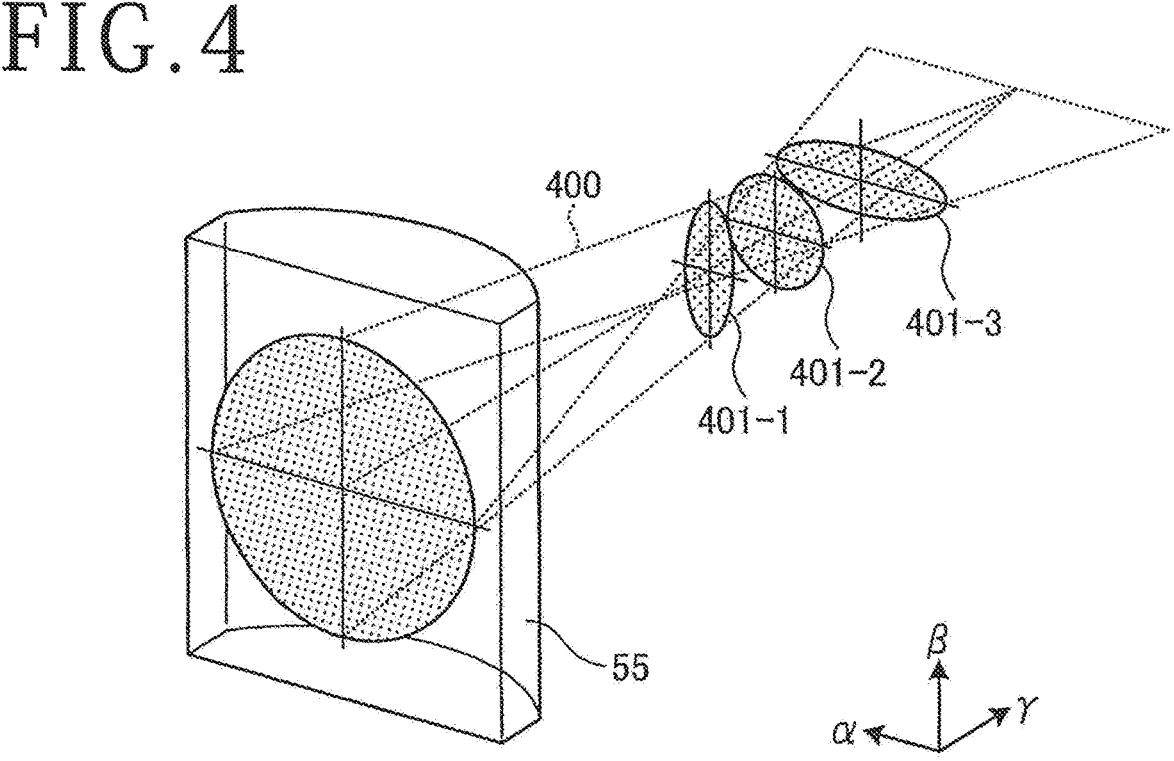
FIG. 4 is an illustration of astigmatism possessed by the height position detection unit depicted in FIG. 3.

As depicted in FIG. 4, the cylindrical lens 55 assumes a substantially semi-cylindrical shape obtained by bisecting a cylinder along its axial direction. The cylindrical lens 55 has a lens effect only in an α direction, fox example, and does not have a lens effect in a β direction. Specifically, the detection laser beam 400 reflected by the back surface 207 of the wafer 201 undergoes a deviation of its focal position in the α direction and its focal position in the β direction from each other when it is transmitted through the cylindrical lens 55, and it is incident on the photodetector 56 in a state in which astigmatism is generated (see FIGS. 5, 6, and 7).

As depicted in FIGS. 4, 5, 6, and 7, of the detection laser beam 400 transmitted through the cylindrical lens 55, the planar shapes of the beams 401-1, 401-2, and 401-3 at positions on the optical axis depict sequential changes from a vertically elongated elliptic shape through a circular shape to a horizontally elongated elliptic shape according to the position on the optical axis. For this reason, when the beams 401-1, 401-2, and 401-3 are received by the photodetector 56 composed of the four-divisional photodiode, the balance of the quantities of light incident individually on divisional regions 56-1, 56-2, 56-3, and 56-4 is varied according to the planar shapes of the beams 401-1, 401-2, and 401-3.

As depicted in FIG. 5, in the case where the beam 401-1 is in a vertically elongated elliptic shape, the quantity of light incident on each of the divisional regions 56-1 and 56-3 of the photodetector 56 is greater than the quantity of light incident on each of the divisional regions 56-2 and 56-4. In addition, as depicted in FIG. 6, in the case where the beam 401-2 is in a circular shape, the quantities of light incident on the divisional regions 56-1, 56-2, 56-3, and 56-4 of the photodetector 56 are equal. Besides, as depicted in FIG. 7, in the case where the beam 401-3 is in a horizontally elongated elliptic shape, the quantity of light incident on each of the divisional regions 56-2 and 56-4 of the photodetector 56 is greater than the quantity of light incident on each of the divisional regions 56-1 and 56-3.

The photodetector 56 outputs to the control unit 100 the quantities of incident light detected in the divisional regions 56-1, 56-2, 56-3, and 56-4. The control unit 100 calculates a difference value between the sum of the quantities of light incident on the divisional region 56-1 and the divisional region 56-3 and the sum of the quantities of light incident on the divisional region 56-2 and the divisional region 56-4.

In the case where the beam 401-1 is in a vertically elongated elliptic shape as depicted in FIG. 5, the above-mentioned difference value is positive (greater than 0). In the case where the beam 401-2 is in a circular shape as depicted in FIG. 6, the difference value is 0 (zero). In the case where the beam 401-3 is in a horizontally elongated elliptic shape as depicted in FIG. 7, the difference value is negative (smaller than 0). In the first embodiment, the height position detection unit 50 outputs to the control unit 100 the quantities of incident light detected in the divisional regions 56-1, 56-2, 56-3, and 56-4.

The imaging unit 80 is a unit for imaging the wafer 201 held by the chuck table 20, and is disposed at a position juxtaposed with the laser beam applying unit 30 in the X-axis direction. In the first embodiment, the imaging unit 80 is mounted to the tip of the support column 13. The imaging unit 80 includes a charge coupled device (CCD) camera or an infrared, camera for imaging the wafer 201 held by the chuck table 20.

The control unit 100 controls constituent elements of the laser processing apparatus 10 to cause the laser processing apparatus 10 to perform an operation of forming the modified layer 203 in the wafer 201. The control unit 100 is a computer. The control unit 100 includes a processor having a microprocessor such as a central processing unit (CPU), a storage apparatus having a memory such as a read only memory (ROM) or a random access memory (RAM), and an input/output interface apparatus.

The processor of the control unit 100 performs a processing according to a computer program stored in the storage apparatus, and outputs control signals for controlling the laser processing apparatus 10 to the aforementioned constituent elements of the laser processing apparatus 10 through the input/output interface apparatus. In addition, the control unit 100 is connected to a display unit 101 including, for example, a liquid crystal display for displaying a status of a processing operation and images, and an input unit 102 to be used when an operator registers information on the contents of processing. The input unit 102 includes at least one of a touch panel provided on the display unit 101 and a keyboard or the like. Besides, in the first embodiment, the control unit 100 constitutes also the evaluation jig 1 for the height position detection unit of the laser processing apparatus.

In addition, the control unit 100 calculates the aforementioned difference value from the quantities of incident light detected in the divisional regions 56-1, 56-2, 56-3, and 56-4, and calculates the distance in the Z-axis direction between the focusing lens 33 and the back surface 207 of the wafer 201, namely, the position in the Z-axis direction of the back surface 207 of the wafer 201, based on the calculated difference value. Note that in the first embodiment, the position of the focal point 301 of the processing laser beam 300 focused by the focusing lens 33 and the position of the focal point of the detection laser beam 400 focused by the focusing lens 33 are different from each other.

Figure 8:
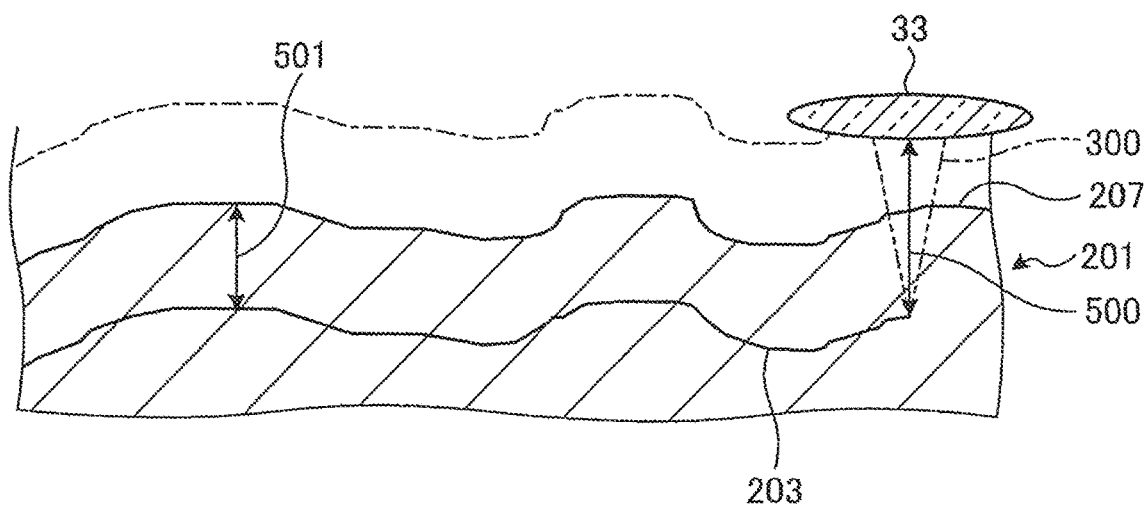
FIG. 8 is an illustration depicting the positional relation between a focusing lens in a processing operation of the laser processing apparatus depicted in FIG. 1 and the back surface of a wafer.

A processing operation of the laser processing apparatus 10 will be described below, based on the drawings. FIG. 8 is an illustration depicting the positional relation between the focusing lens and the back surface of the wafer during a processing operation of the laser processing apparatus depicted in FIG. 1.

The laser processing apparatus 10 starts a processing operation when an instruction to start the processing operation is given by an operator after the operator registers the information on the contents of processing in the control unit 100 and the operator mounts the wafer 201 on the holding surface 21 of the chuck table 20. In the processing operation, the control unit 100 of the laser processing apparatus 10 drives the evacuation source to hold the wafer 201 on the holding surface 21 by suction.

In the processing operation, the control unit 100 of the laser processing apparatus 10 performs alignment based on an image of the wafer 201 which is picked up by the imaging unit 80, causing the rotating unit 23 to set the plurality of first division lines 202-1 parallel to the X-axis direction, and thereafter aligns one end of one predetermined first division line 202-1 of the plurality of first division lines 202-1 and the processing head 31 of the laser beam applying unit 30 to each other in the Z-axis direction. The control unit 100 of the laser processing apparatus 10, while causing the X-axis moving unit 60 to move the chuck table 20 in the X-axis direction, causes the detection laser oscillator 51 of the height position detection unit 50 to oscillate the detection laser beam 400, and applies the detection laser beam 400 sequentially to points ranging from one end to the other end of the one first division line 202-1. The control unit 100 of the laser processing apparatus 10 calculates the positions in the Z-axis direction of the back surface 207 of the wafer 201 ranging from the one end to the other end of the one first division line 202-1, based on a detection signal from the photodetector 56 of the height position detection unit 50, and stores the positions.

The control unit 100 of the laser processing apparatus 10 causes the rotating unit 23 to set the plurality of second division lines 202-2 parallel to the X-axis direction, aligns one end of one predetermined second division line 202-2 of the plurality of second division lines 202-2 and the processing head 31 of the laser beam applying unit 30 to each other in the Z-axis direction. The control unit 100 of the laser processing apparatus 10, while causing the X-axis moving unit 60 to move the chuck table 20 in the X-axis direction, causes the detection laser oscillator 51 of the height position detection unit 50 to oscillate the detection laser beam 400, and applies the detection laser beam 400 sequentially to points ranging from one end to the other end of the one second division line 202-2. The control unit 100 of the laser processing apparatus 10 calculates the positions in the Z-axis direction of the back surface 207 of the wafer 201 ranging from the one end to the other end of the one second division line 202-2, based on a detection signal from the photodetector 56 of the height position detection unit 50, and stores the positions. Note that the division lines 202-1 and 202-2 used to detect the positions in the Z-axis direction of the back surface 207 by the height position detection unit 50 are each desirably a division line passing through the center of the back surface 207 of the wafer 201, or desirably a division line nearer to the center of the back surface 207 of the wafer 201.

The control unit 100 of the laser processing apparatus 10 applies the processing laser beam 300 over the whole lengths of the pluralities of division lines 202-1 and 202-2, thereby forming the modified layers 203 in the inside of the wafer 201. When applying the processing laser beam 300, the control unit 100 of the laser processing apparatus 10 controls the focal point position adjusting unit 40, based on the positions of the Z-axis direction of the back surface 207 of the wafer 201 ranging from the one end to the other end of the division lines 202-1 and 202-2 calculated from the detection signal from the height position detection unit 50, in such a manner that the distance between the back surface 207 and the focusing lens 33 is constant at a distance 500 determined based on the position where to form the modified layer 203 in the inside of the wafer 201, as depicted in FIG. 8. As a result, as depicted in FIG. 8, the distance 501 from the back surface 207 to the modified layer 203 is constant over the whole length of the division line 202-1 or 202-2. Note that in FIG. 8, the track of the focusing lens 33 is indicated by alternate long and short dash line, and variation in the height of the back surface 207 is indicated in an exaggerated form as compared to an actual form. The control unit 100 of the laser processing apparatus 10 forms the modified layers 203 in the inside of the wafer 201, along all the division lines 201-1 and 202-2, whereon the processing operation is finished.

Figure 9:
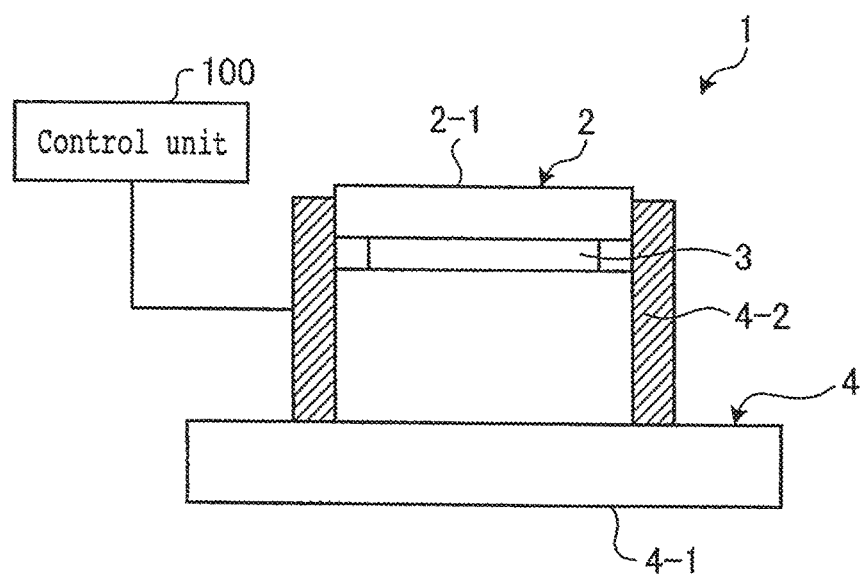
FIG. 9 is an illustration depicting the configuration of the evaluation jig for the height position detection unit according to the first embodiment.
Figure 10:
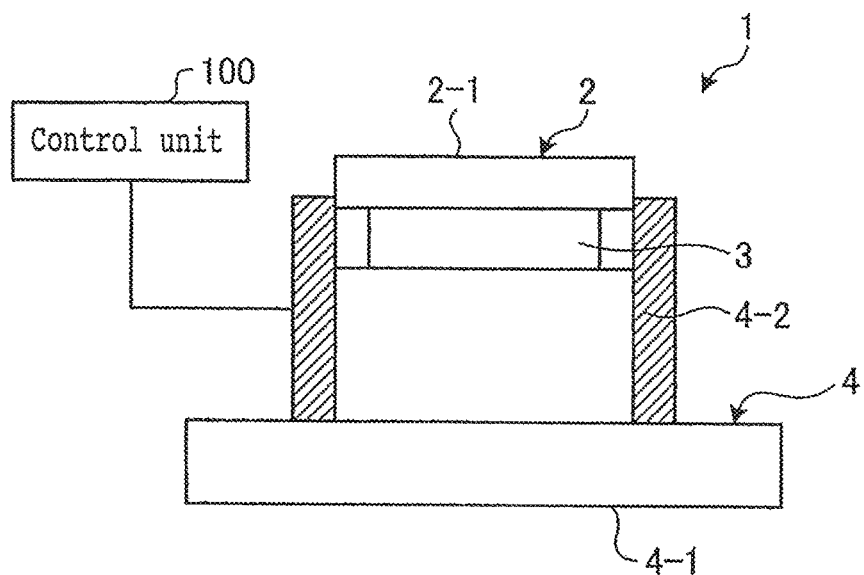
FIG. 10 is a sectional view depicting a state in which a to-be-irradiated surface of the evaluation jig of the height position detection unit depicted in FIG. 9 is raised.
Figure 11:
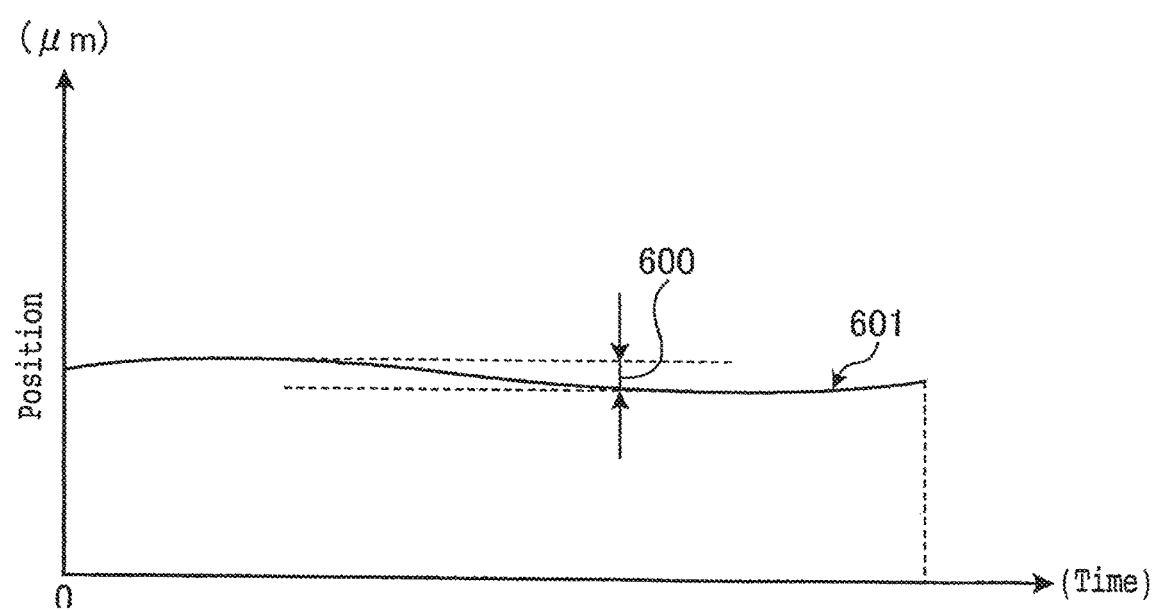
FIG. 11 is an illustration depicting an example of a movement program set by a control section of the evaluation jig for the height position detection unit depicted in FIG. 9.

The evaluation jig 1 for the height position detection unit of the laser processing apparatus according to the first embodiment will be described below, based on the drawings. FIG. 9 is a sectional view depicting the configuration of the evaluation jig for the height position detection unit according to the first embodiment. FIG. 10 is a sectional view depicting a state in which a to-be-irradiated surface 2-1 of the evaluation jig for the height position detection unit depicted in FIG. 9 is raised. FIG. 11 is an illustration depicting an example of a movement program set by a control section of the evaluation jig for the height position detection unit depicted in FIG. 9.

The evaluation jig 1 for the height position detection unit of the laser processing apparatus (hereinafter referred to simply as the evaluation jig) is a jig for evaluating the accuracy of detection of the position of the back surface 207 of the wafer 201 by the height position detection unit 50 of the laser processing apparatus 10. As depicted in FIGS. 9 and 10, the evaluation jig 1 includes a to-be-irradiated member 2, an actuator 3 provided with the aforementioned control unit 100, and a base section 4.

The to-be-irradiated member 2 is disposed on the base section 4 so as to be movable in the Z-axis direction (height direction), and is opposed to the processing head 31 of the laser beam applying unit 30 when the base section 4 is mounted on the holding surface 21 of the chuck table 20. The to-be-irradiated member 2 is provided with the to-be-irradiated surface 2-1 which is parallel to both the X-axis direction and the Y-axis direction and is opposed to the processing head 31 when the base section 4 is mounted on the holding surface 21 of the chuck table 20. The to-be-irradiated surface 2-1 is irradiated with the detection laser beam 400 oscillated by the detection laser oscillator 51 of the height position detection unit 50.

The actuator 3 is accommodated in the base section 4, and moves the to-be-irradiated surface 2-1 in the Z-axis direction, which is a direction intersecting the to-be-irradiated surface 2-1. In the first embodiment, the actuator 3 is mounted to the to-be-irradiated member 2. The actuator 3 is a so-called piezo actuator having a piezoelectric material sandwiched between two electrodes; with an electric power impressed on the electrodes, the actuator 3 moves the to-be-irradiated surface 2-1 in the Z-axis direction, as depicted in FIGS. 9 and 10. Note that in the first embodiment, the actuator 3 is a piezo actuator, but this is not restrictive.

The base section 4 supports the actuator 3, and is to be mounted on the holding surface 21 of the chuck table 20. The base section 4 includes a flat plate portion 4-1 which is formed in a flat plate-like shape and is mounted on the holding surface 21 of the chuck table 20, and a hollow cylindrical portion 4-2 formed in a hollow cylindrical shape erected from the flat plate portion 4-1. The base section 4 accommodates the actuator 3 in the hollow cylindrical portion 4-2, and supports the actuator 3 on the flat plate portion 4-1.

The control unit 100 controls the actuator 3. As depicted in FIG. 1, the control unit 100 includes a storage section 110, and a control section 120. The storage section 110 stores a movement program setting program 111 therein. The movement program setting program 111 is a program for setting a movement program 601, which is used at the time of evaluation of the height position detection unit 50, for controlling the actuator 3 to move the to-be-irradiated surface 2-1 in the Z-axis direction at a desired amplitude 600 depicted in FIG. 11, thereby simulating the position of the back surface 207 of the division line 202-1 or 202-2 of the wafer 201 as the workpiece. Note that the movement program setting program 111 desirably sets such a movement program 601 that the position in the Z-axis direction of the to-be-irradiated surface 2-1 at the time of evaluation of the height position detection unit 50 will be equal to the position in the Z-axis direction presumed to be detected by irradiating the division line 202-1 or 202-2 of the wafer 201 with the detection laser beam 400 by the height position detection unit 50.

At the time of evaluating the height position detection unit 50, the whole length of the division line 202-1 or 202-2 to be irradiated with the detection laser beam 400 of the wafer 201 as the workpiece and a moving speed for the chuck table 20 during the irradiation with the detection laser beam 400 are inputted to the control section 120 by an operator's operation of the input unit 102. At the time of evaluating the height position detection unit 50, the control section 120 executes the movement program setting program 111, based on the inputted values of the whole length of the division line 202-1 or 202-2 and the moving speed for the chuck table 20 during the irradiation with the detection laser beam 400, to set, for example, the movement program 601 depicted in FIG. 11. In the first embodiment, the movement program 601 depicted in FIG. 11 includes an amplitude 600 in the Z-axis direction of the to-be-irradiated surface 2-1 by the actuator 3, the number of movements of the to-be-irradiated surface 2-1, and a moving speed of the to-be-irradiated surface 2-1. Note that the axis of abscissas in FIG. 11 represents elapsed time from the start of irradiation with the detection laser beam 400 for evaluation of the height position detection unit 50, and the axis of ordinates represents the position in the Z-axis direction of the to-be-irradiated surface 2-1.

Specifically, at the time of evaluating the height position detection unit 50, the control section 120 executes the movement program setting program 111, based on the inputted values of the whole length of the division line 202-1 or 202-2 and the moving speed for the chuck table 20 during irradiation with the detection laser beam 400, to set an amplitude 600 in the Z-axis direction of the to-be-irradiated surface 2-1 by the actuator 3, the number of movements of the to-be-irradiated surface 2-1, and a moving speed of the to-be-irradiated surface 2-1. At the time of evaluating the height position detection unit 50, the control section 120 controls the movement of the actuator 3 in conformity with the movement program 601 set.

The processor of the control unit 100 executes processing according to the computer program stored in the storage apparatus, to realize the function of the control section 120. The storage apparatus of the control unit 100 realizes the function of the storage section 110.

Figure 12:
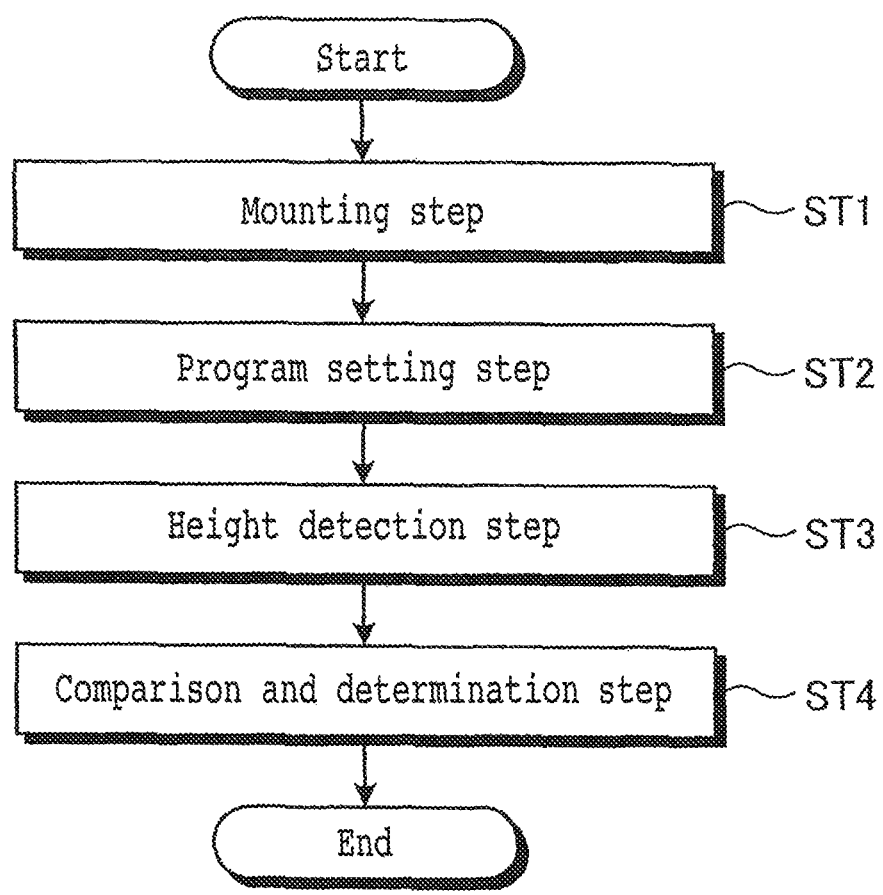
FIG. 12 is a flow chart depicting an evaluation method for the height position detection unit according to the first embodiment.
Figure 13:
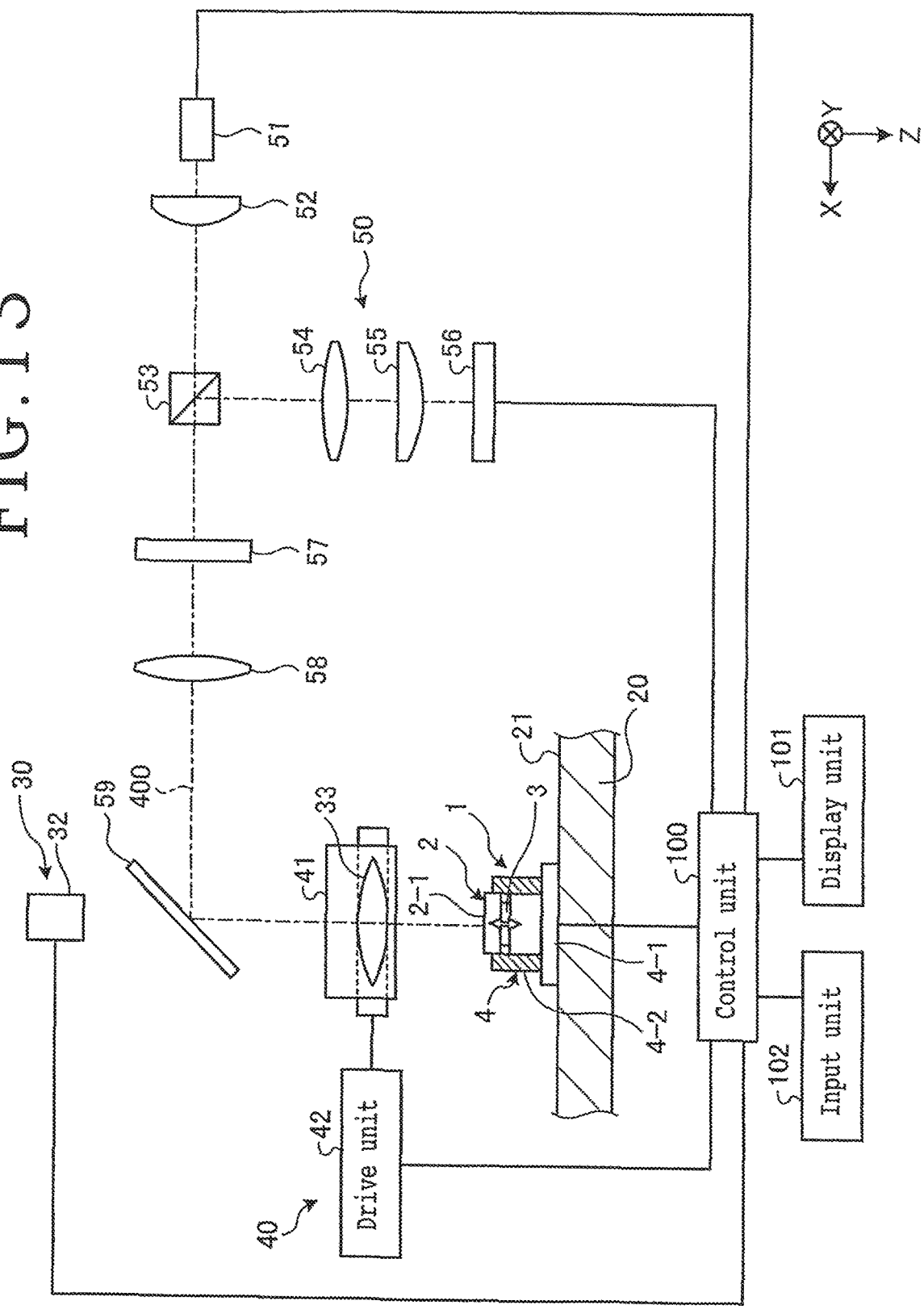
FIG. 13 is an illustration depicting a mounting step and a height defection step of the evaluation method for the height position detection unit depicted in FIG. 12.
Figure 14:
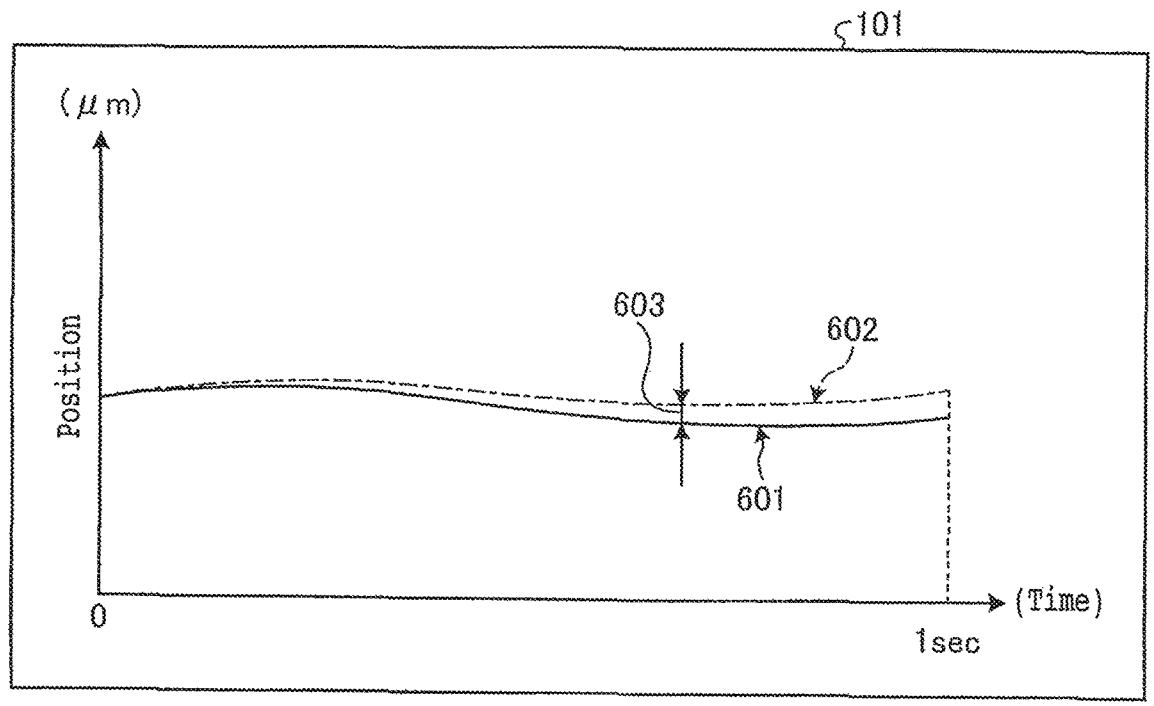
FIG. 14 is an illustration depicting an example of a determination result of a comparison and determination step of the evaluation method for the height position detection unit depicted in FIG. 12.

An evaluation method for the height position detection unit of the laser processing apparatus according to the first embodiment will be described below, based on the drawings. FIG. 12 is a flow chart depicting the evaluation method for the height position detection unit according to the first embodiment. FIG. 13 is an illustration depicting a mounting step and a height detection step in the evaluation method for the height position detection unit depicted in FIG. 12. FIG. 14 is an illustration depicting an example of a determination result of a comparison and determination step in the evaluation method for the height position detection unit depicted in FIG. 12.

The evaluation method for the height position detection unit of the laser processing apparatus (hereinafter referred to simply as the evaluation method) according to the first embodiment is a method for evaluating the accuracy of detection of the position of the back surface 207 of the wafer 201 by the height position detection unit 50 of the laser processing apparatus 10. As depicted in FIG. 12, the evaluation method includes a mounting step ST1, a program setting step ST2, a height detection step ST3, and a comparison and determination step ST4.

The mounting step ST1 is a step of mounting the evaluation jig 1 on the holding surface 21 of the chuck table 20. In the first embodiment, in the mounting step, the operator mounts the evaluation jig 1 on the center of the holding surface 21 of the chuck table 20 of the laser processing apparatus 10, as illustrated in FIG. 13. The evaluation method proceeds to the program setting step ST2.

The program setting step ST2 is a step of setting the movement program 601 for controlling the actuator 3 of the evaluation jig 1 to move the to-be-irradiated surface 2-1 at a desired amplitude 600. In the program setting step ST2, the operator inputs a whole length of the division line 202-1 or 202-2 to be irradiated with the detection laser beam 400 of the wafer 201 as the workpiece, a moving speed for the chuck table 20 during irradiation with the detection laser beam 400, and a desired height of the to-be-irradiated surface 2-1, by operating the input unit 102.

In the program setting step ST2, when the control unit 100 accepts the whole length of the division line 202-1 or 202-2 to be irradiated with the detection laser beam 400 and the moving speed for the chuck table 20 during irradiation with the detection laser beam 400, the control section 120 executes the movement program setting program 111, to set, for example, the movement program 601 depicted in FIG. 11. In the first embodiment, the movement program 601 depicted in FIG. 11 set in the program setting program ST2 has settings of an amplitude 600 of 5 μm, the number of movements of one reciprocation, and a moving speed of 10 μm/second. The evaluation method proceeds to the height detection step ST3.

The height detection step ST3 is a step of irradiating the to-be-irradiated surface 2-1 of the evaluation jig 1 mounted on the holding surface 21 with the detection laser beam 400 and detecting, by the height position detecting unit 50, variation in the position in the Z-axis direction, which is the height position of the to-be-irradiated surface 2-1 moved at the desired amplitude 600 by the movement program 601. In the height detection step ST3, upon accepting an evaluation, starting command from the operator through the input unit 102 or the like, the control unit 100 controls the X-axis moving unit 60 and the Y-axis moving unit 70 to oppose the processing head 31 to the to-be-irradiated surface 2-1 in the Z-axis direction. As depicted in FIG. 13, the control unit 100 operates the actuator 3 by executing the movement program 601 calculated in the program setting step ST2 by the control section 120, and irradiates the to-be-irradiated surface 2-1 with the detection laser beam 400. Then, the control unit 100 detects the position 602 in the Z-axis direction of the to-be-irradiated surface 2-1 as indicated by alternate long and short dash line in FIG. 14, based on the result of detection by the photodetector 56 of the height position detection unit 50.

Note that the axis of abscissas in FIG. 14 represents elapsed time from the start of irradiation with the detection laser beam 400 for evaluation of the height position detection unit 50, and the axis of ordinates represents the position in the Z-axis direction of the to-be-irradiated surface 2-1. In addition, in FIG. 14, the solid line represents the movement program 601 set in the program setting step ST2, and the alternate long and short dash line represents the position 602 in the Z-axis direction of the to-be-irradiates surface 2-1 which is calculated based on the result of detection by the photodetector 56. Upon finishing the execution of the movement program 601, the evaluation method finishes the height detection step ST3, and proceeds to the comparison and determination step ST4.

The comparison and determination step ST4 is a step of comparing the variation in the position in the Z-axis direction which is the height position of the to-be-irradiated surface 2-1 detected in the height detection step ST3 with the amplitude 600 of the movement program 601 set in the program setting step ST2, and determining whether or not the height position detection unit 50 has successfully detected the position in the Z-axis direction of the to-be-irradiated surface 2-1. In the comparison and determination step ST4, the control unit 100 displays the movement program 601 set in the program setting step ST2 and the position 602 in the Z-axis direction of the to-be-irradiated surface 2-1 calculated based on the result of detection by the photodetector 56 in the height detection step ST3, on the display unit 101, as depicted in FIG. 14.

In the first embodiment, in the comparison and determination step ST4, the operator compares the movement program 601 set in the program setting step ST2 with the position 602 in the Z-axis direction of the to-be-irradiated surface 2-1 calculated based on the result of detection by the photodetector 56 in the height detection step ST3, to thereby determine whether or not the height position detection unit 50 has successfully detected the position in the Z-axis direction of the to-be-irradiated surface 2-1. Specifically, in the comparison and determination step ST4, when a maximum difference 603 between, the movement program 601 set in the program setting step ST2 and the position 602 in the Z-axis direction of the to-be-irradiated surface 2-1 calculated based on the result of detection by the photodetector 56 in the height detection step ST3 is in excess of a predetermined value, the operator determines that the height position detection unit 50 has not yet successfully detected the height position of the to-be-irradiated surface 2-1, and determines that the height position detection unit 50 is defective.

In the comparison and determination step ST4, when the maximum difference 603 between the movement, program 601 set in the program setting step ST2 and the position 602 in the Z-axis direction of the to-be-irradiated surface 2-1 calculated based on the result of detection by the photodetector 56 in the height detection step ST3 is not more than a predetermined value, the operator determines that the height position detection unit 50 has successfully detected the height position of the to-be-irradiated surface 2-1, and determines that the height position detection unit 50 is acceptable. Note that in the first embodiment, in the comparison and determination step ST4, the operator makes a determination based on the maximum difference 603 between the movement program 601 set in the program setting step ST2 and the position 602 in the Z-axis direction of the to-be-irradiated surface 2-1 calculated based on the result of detection by the photodetector 56 in the height detection step ST3; in the present invention, however, the control section 120 of the control unit 100 may automatically make a determination in a similar way and may display the determination result on the display unit 101.

Since the evaluation jig 1 according to the first embodiment has the actuator 3 for moving the to-be-irradiated surface 2-1 in the Z-axis direction, it is possible, by moving the to-be-irradiated surface 2-1 in the Z-axis direction by the actuator 3, to simulate the position in the Z-axis direction of the division line 202 to be irradiated with the detection laser beam 400 of the wafer 201 by using the to-be-irradiated surface 2-1. As a result, the evaluation jig 1 makes it possible to evaluate the height position detection unit 50 through irradiation of the to-be-irradiated surface 2-1 moved by the actuator 3 with the detection laser beam 400, without using an evaluation plate-shaped body whose position in the Z-axis direction is preliminarily known.

In addition, since the evaluation jig 1 has the actuator 3 including the piezo actuator, it enables the to-be-irradiated surface 2-1 to be moved at a minute amplitude 600, so that it is possible to simulate the position in the Z-axis direction of the division line 202 to be irradiated with the detection laser beam 400 of the wafer 201 by using the to-be-irradiated surface 2-1.

In the evaluation method according to the first embodiment, the to-be-irradiated surface 2-1 is moved in the Z-axis direction by controlling the actuator 3 in conformity with the movement program 601 set in the program setting step ST2, and, therefore, it is possible to simulate the position in the Z-axis direction of the division line 202 to be irradiated with the detection laser beam 400 of the wafer 201 by using the to-be-irradiated surface 2-1. As a result, the evaluation method makes it possible to evaluate the height position detection unit 50 by irradiating the to-be-irradiated surface 2-1 moved in the Z-axis direction by the actuator 3 with the detection laser beam 400 in the height detection step ST3, without using an evaluation plate-shaped body whose position in the Z-axis direction is preliminarily known.

Besides, according to the evaluation method, the height position detection unit 50 can be evaluated by irradiating the to-be-irradiated surface 2-1 moved in the Z-axis direction by the actuator 3 with the detection laser beam 400 in the height detection step ST3, without using an evaluation plate-shaped body whose position in the Z-axis direction is preliminarily known, and, therefore, the height position detection unit 50 can be evaluated without moving the chuck table 20 in the X-axis direction. As a result, the evaluation method makes it possible to evaluate the height position detection unit 50 without being influenced by vibrations attendant on the movement of the chuck table 20 in the X-axis direction.

Second Embodiment

Figure 15:
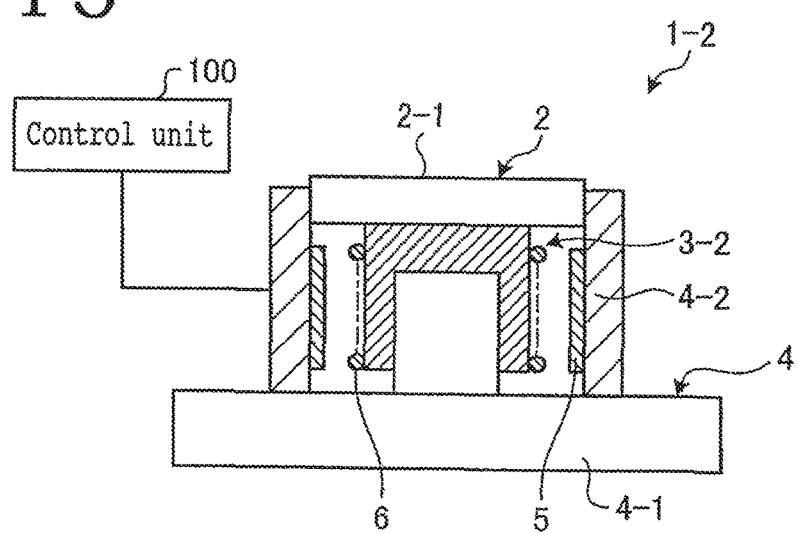
FIG. 15 is a sectional view depicting the configuration of an evaluation jig for a height position detection unit according to a second embodiment.

An evaluation jig 1-2 for a height position detection unit of a laser processing apparatus according to a second embodiment will be described. FIG. 15 is a sectional view depicting the configuration of the evaluation jig for the height position detection unit according to the second embodiment. In FIG. 15, the same parts as those in the first embodiment above are denoted by the same reference symbols as used above, and descriptions of them will be omitted.

The evaluation jig 1-2 for the height position detection unit of the laser processing apparatus (hereinafter referred to simply as the evaluation jig) according to the second embodiment has the same configuration as in the first embodiment, except that an actuator 3-2 is different from that in the first embodiment.

As illustrated in FIG. 15, the actuator 3-2 of the evaluation jig 1-2 is a so-called voice coil motor including a hollow cylindrical permanent magnet 5 mounted to an inner peripheral surface of a hollow cylindrical portion 4-2 of a base section 4, and a coil 6 mounted to an outer peripheral surface of a cylindrical portion of a to-be-irradiated member 2. With electric power impressed on the coil 6, the actuator 3-2 moves a to-be-irradiated surface 2-1 in the Z-axis direction. Note that in the second embodiment, the actuator 3-2 is a voice coil motor, but this is not limitative.

The evaluation jig 1-2 according to the second embodiment has the actuator 3-2 for moving the to-be-irradiated surface 2-1 in the Z-axis direction, like in the first embodiment; therefore, it is possible, by irradiating the to-be-irradiated surface 2-1 moved by the actuator 3-2 with a detection laser beam 400, to evaluate a height position detection unit 50, without using an evaluation plate-shaped body whose position in the Z-axis direction is preliminarily known.

Third Embodiment

Figure 16:
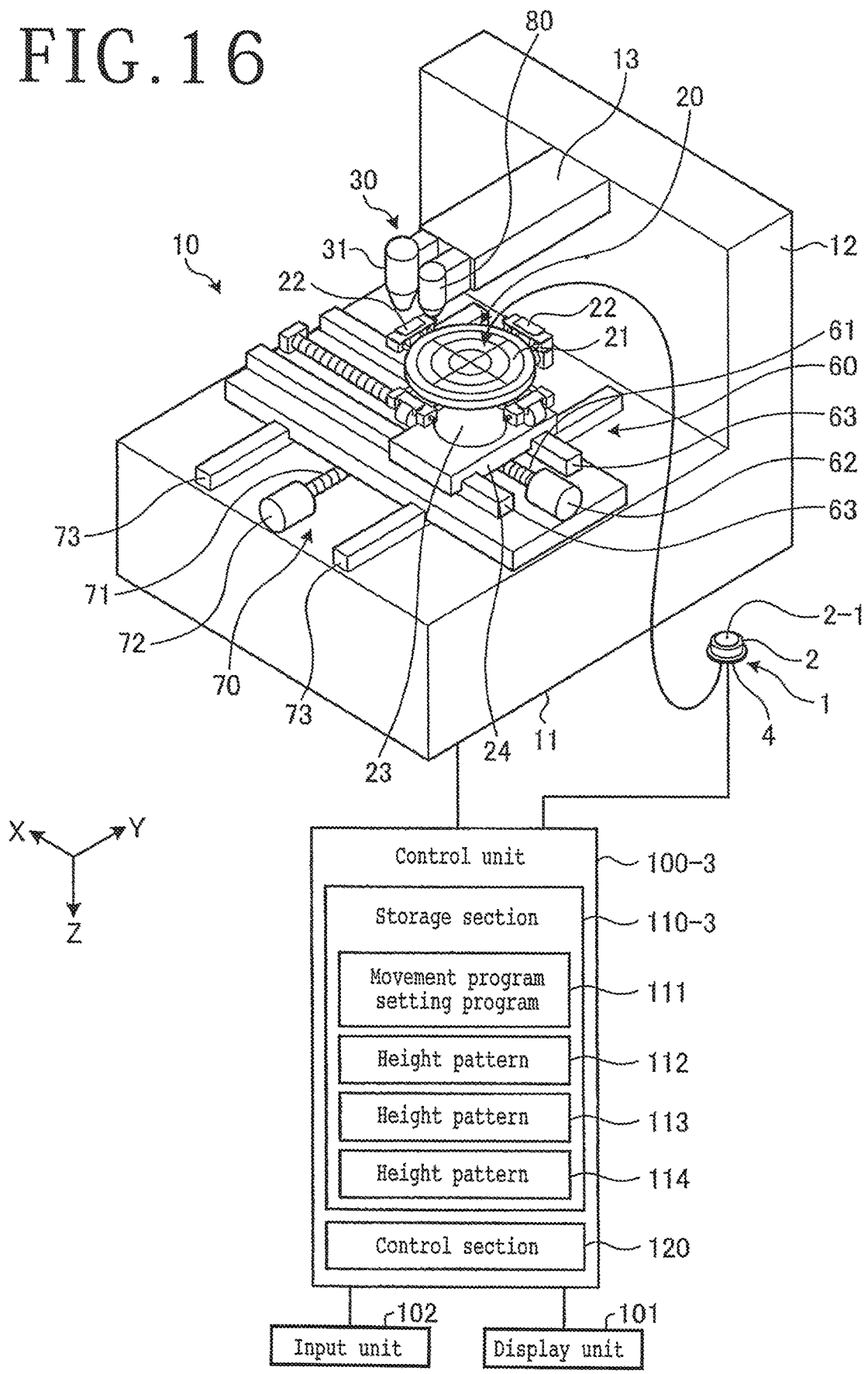
FIG. 16 is an illustration depicting the configuration of an evaluation jig for a height position detection unit according to a third embodiment.
Figure 17:
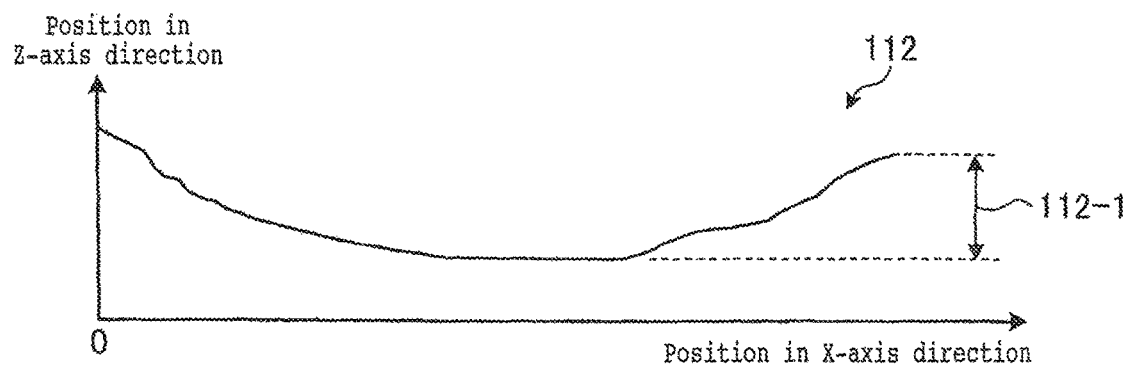
FIG. 17 is an illustration depicting an example of a height pattern stored in a storage section of a control unit of the evaluation jig for the height position detection unit depicted in FIG. 16.
Figure 18:
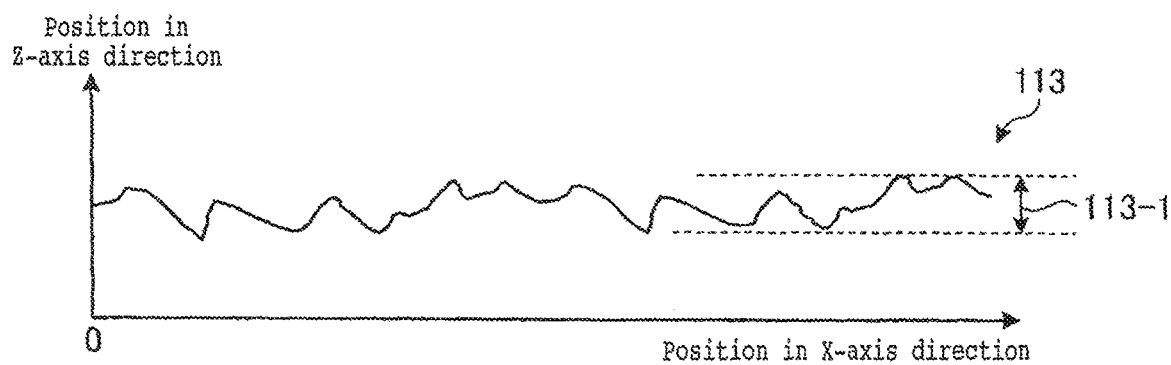
FIG. 18 is an illustration depicting another example of the height pattern stored in the storage section of the control unit of the evaluation, jig for the height position detection unit depicted in FIG. 16.
Figure 19:
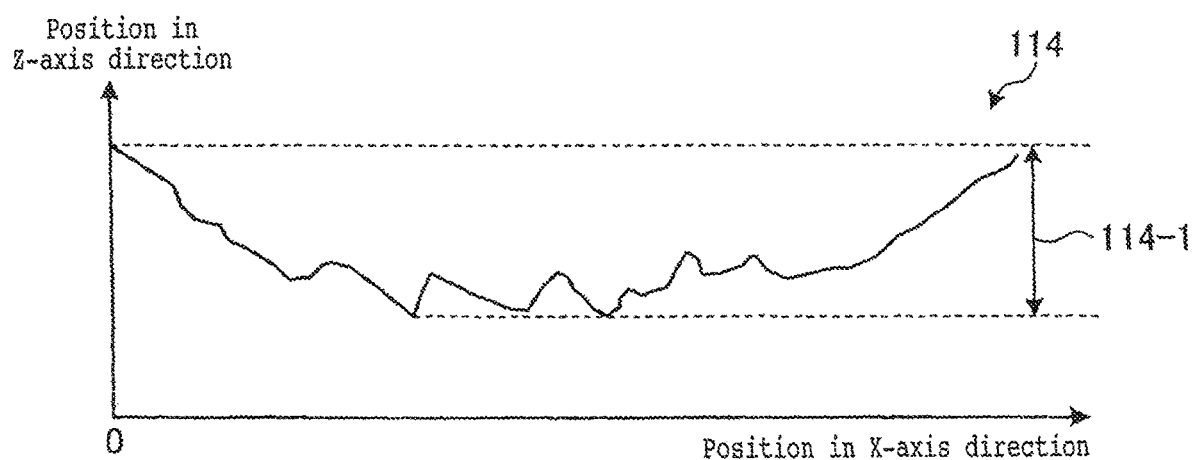
FIG. 19 is an illustration depicting a further example of the height pattern stored in the storage section of the control unit of the evaluation jig for the height position detection unit depicted in FIG. 16.

An evaluation jig 1 for a height position detection unit of a laser processing apparatus according to a third embodiment will be described. FIG. 16 is an illustration depicting the configuration of the evaluation jig for the height position detection unit according to the third embodiment. FIG. 17 is an illustration depicting an example of a height pattern stored in a storage section of a control unit of the evaluation jig for the height position detection unit depicted in FIG. 16. FIG. 18 is an illustration depicting another example of the height pattern stored in the storage section of the control unit of the evaluation jig for the height position detection unit depicted in FIG. 16. FIG. 19 is an illustration depicting a further example of the height pattern stored in the storage section of the control unit of the evaluation jig for the height position detection unit depicted in FIG. 16. In FIGS. 16 to 19, the same parts as those in the first embodiment above are denoted by the same reference symbols as used above, and descriptions of them will be omitted.

The evaluation jig 1 for the height position detection unit of the laser processing apparatus (hereinafter referred to simply as the evaluation jig) according to the third embodiment has the same configuration as that of the evaluation jig 1 in the first embodiment, except that not only a movement program setting program 111 but also height patterns 112, 113, and 114 are stored in a storage section 110-3 of a control unit 100-3, as depicted in FIG. 16. The height patterns 112, 113, and 114 depicted in FIGS. 17, 18, and 19 depict the position in the Z-axis direction of the back surface 207 of the division line 202-1 or 202-2 to be irradiated with the detection laser beam 400 of the wafer 201 as the workpiece. Note that the axis of abscissas in FIGS. 17, 18, and 19 represents the position in the X-axis direction of the division line 202-1 or 202-2 to be irradiated with the detection laser beam 400, and the axis of ordinates represents the position in the Z-axis direction of the back, surface 207 of the division line 202-1 or 202-2 to be irradiated with the detection laser beam 400.

In addition, the distances 112-1, 113-1, and 114-1 in the Z-axis direction between the highest position and the lowest position in the Z-axis direction of the to-be-irradiated surface 2-1 in the height patterns 112, 113, and 114 are comparable to the amplitude 600 included in the movement program 601, and is, for example, approximately 5 μm. Note that the height pattern 112 depicted in FIG. 17 illustrates the position in the z-axis direction of the back surface 207 of the division line 202-1 or 202-2 to be irradiated with the detection laser beam 400 of a wafer 201 wherein a central portion is recessed as compared to outer edge portions. The height pattern 113 depicted in FIG. 18 illustrates the position in the Z-axis direction of the back surface 207 of the division line 202-1 or 202-2 to be irradiated with the detection laser beam 400 of a wafer 201 wherein a minute rugged pattern is formed in the back surface 207. The height pattern 114 depicted in FIG. 19 illustrates the position in the Z-axis direction of the back surface 207 of the division line 202-1 or 202-2 to be irradiated with the detection laser beam 400 of a wafer 201 wherein a central portion is recessed as compared to outer edge portions and a minute rugged pattern is formed in the back surface 207.

Note that while the three height patterns 112, 113, and 114 are stored in the storage section 110-3 in the third embodiment, the number of the height patterns 112, 113, and 114 stored in the storage section 110-3 in the present invention is not limited to three. In addition, the height patterns 112, 113, and 114 depicted in FIGS. 17, 18, and 19 can be produced by measuring the position in the Z-axis direction of the back surface of the division line 202 to be irradiated with the detection laser beam 400, for a plurality of wafers 201.

In the program setting step ST2 in the evaluation method for the height position detection unit of the laser processing apparatus (hereinafter referred to simply as the evaluation method) according to the third embodiment, the operator selects one of the height patterns 112, 113, and 114 by operating the input unit 102. In the program setting step ST2, when the control unit 100-3 accepts the selected height pattern 112, 113, or 114 in addition to the inputted values of the whole length of the division line 202-1 or 202-2 to be irradiated with the detection laser beam 400 and the moving speed for the chuck table during irradiation with the detection laser beam 400, the control section 120 executes the movement program setting program 111, to set a movement program 601.

The movement program setting program 111 of the third embodiment is for setting such a movement program 601 that the position in the Z-axis direction of the to-be-irradiated surface 2-1 will be equal to the selected height pattern 112, 113, or 114, based on the whole length of the division line 202-1 or 202-2 to be irradiated with the detection laser beam 400 and the moving speed for the chuck table 20 during irradiation with the detection laser beam 400. Therefore, in the program setting step ST2 in the evaluation method according to the third embodiment, the control section 120 of the control unit 100-3 executes the movement program setting program 111, to set such a movement program 601 that the position in the Z-axis direction of the to-be-irradiated surface 2-1 will be equal to the selected height pattern 112, 113, or 114.

The evaluation jig 1 and the evaluation method according to the third embodiment is provided with the actuator 3 for moving the to-be-irradiated surface 2-1 in the Z-axis direction, like in the first embodiment, and, therefore, the height position detection unit 50 can be evaluated by irradiating the to-be-irradiated surface 2-1 moved by the actuator 3 with the detection laser beam 400, without using an evaluation plate-shaped body whose position in the Z-axis direction is preliminarily known.

In addition, in the evaluation jig 1 and the evaluation method according to the third embodiment, there is set such a movement program 601 that the position in the Z-axis direction of the to-be-irradiated surface 2-1 will be equal to one of the height patterns 112, 113, and 114 which can be produced by measuring the position in the Z-axis direction of the back surface 207 of the division line 202 to be irradiated with the detection laser beam 400, for a plurality of wafers 201, and, therefore, the position of the to-be-irradiated surface 2-1 can be set close to the actual wafer 201.

Note that the present invention is not to be limited to the above-described embodiments. The present invention can be carried out with various modifications without departing from the gist of the invention. Note that while the constituent elements of the laser processing apparatus 10 are controlled by the control unit 100 or 100-3 of the evaluation jig 1 or 1-2 in the first to third embodiments, the control unit 100 or 100-3 of the evaluation jig 1 or 1-2 in the present invention may be composed of other unit than the control unit for controlling the constituent elements of the laser processing apparatus 10.

The present invention is not limited to the details of the above described preferred embodiments. The scope of the invention is defined by the appended claims and all changes and modifications as fall within the equivalence of the scope of the claims are therefore to be embraced by the invention.

What is claimed is:
1. An evaluation jig for a height position detection unit of a laser processing apparatus, the laser processing apparatus including:
a chuck table that holds a workpiece by a holding surface, a laser beam applying unit having a laser oscillator that applies a processing laser beam having such a wavelength as to be transmitted through the workpiece to the workpiece held by the chuck table, and a focusing unit that focuses the processing laser beam, a focal point position adjusting unit that displaces a focal point position of the processing laser beam, the height position detection unit that applies a detection laser beam to the workpiece held by the chuck table through the focusing unit to detect a height position of an upper surface of the workpiece, and a control unit that controls the focal point position adjusting unit based on a detection signal from the height position detection unit, the evaluation jig comprising:
- a to-be-irradiated surface which is to be irradiated with the detection laser beam;
- an actuator that moves the to-be-irradiated surface in a direction orthogonal to the to-be-irradiated surface;
- a base section which supports the actuator and is mounted on the holding surface; and
- a control section that controls movement of the actuator,
- wherein the evaluation jig is seated upon the holding surface of the chuck table.

2. The evaluation jig for the height position detection unit according to claim 1, wherein the actuator is selected from the group consisting of a piezo actuator and a voice coil motor.

3. An evaluation method for a height position detection unit of a laser processing apparatus, the evaluation method comprising:

mounting an evaluation jig on a holding surface of a chuck table of the laser processing apparatus, the evaluation jig including a to-be-irradiated surface which is to be irradiated with a detection laser beam, an actuator that moves the to-be-irradiated surface in a direction orthogonal to the to-be-irradiated surface, a base section which supports the actuator and is mounted on the holding surface of the chuck table, and a control section that controls movement of the actuator;

setting a movement program for controlling the actuator of the evaluation jig to move the to-be-irradiated surface at a desired amplitude;

irradiating the to-be-irradiated surface of the evaluation jig mounted on the holding surface with the detection laser beam of the laser processing apparatus and detecting variation in a height position of the to-be-irradiated surface moved at the desired amplitude according to the movement program by the height position detection unit of the laser processing apparatus;

comparing the variation in the height position detected by the height position detection unit with the amplitude set as the desired amplitude; and determining whether or not the height position detection unit has successfully detected the height position of the to-be-irradiated surface.

4. The evaluation jig for the height position detection unit of a laser processing apparatus according to claim 1, wherein the evaluation jig further comprises:
- a to-be-irradiated member that includes the to-be-irradiated surface thereon; and
- a hollow portion that is seated upon the base section and that is configured and arranged for movably supporting the to-be-irradiated member therein.

5. The evaluation jig for the height position detection unit of a laser processing apparatus according to claim 4, wherein the hollow portion comprises a hollow cylindrical portion formed in a hollow cylindrical shape.

6. The evaluation method according to claim 3, wherein the irradiating and the detecting variation in the height position is performed while moving the to-be-irradiated surface in a Z-axis direction and without moving the to-be-irradiated surface in an X-axis direction.

* * * * *